J. MORSCHHAUSER,

Assignor to W. H. HICKS.

Bottle Stopper.

No. 9,521. Reissued Dec. 28, 1880.

Witnesses

E. L. Sherman

E. L. Cook

Inventor

Joseph Morschhauser by W. H. Hicks his attorney

N. PETERS, PHOTO-LITHOGRAPHER, WASHINGTON, D. C.

UNITED STATES PATENT OFFICE.

JOSEPH MORSCHHAUSER, OF HYDE PARK, ASSIGNOR TO WILLIAM H. HICKS, OF NEW YORK, N. Y.

BOTTLE-STOPPER.

SPECIFICATION forming part of Reissued Letters Patent No. 9,521, dated December 28, 1880.

Original No. 173,133, dated February 8, 1876. Application for reissue filed August 25, 1879.

*To all whom it may concern:*

Be it known that I, JOSEPH MORSCHHAUSER, of Hyde Park, county of Dutchess, and State of New York, have invented certain new and useful Improvements in Bottle-Stoppers; and I hereby declare that the following is a full, clear, and exact description and specification of the same, reference being had to the annexed drawings, making part thereof.

This invention consists in certain combinations of parts specifically set forth in the claim at the end of this specification.

In order that persons skilled in the art may understand, make, and use my invention, I will proceed to describe the manner in which I have embodied it.

Figure 1:
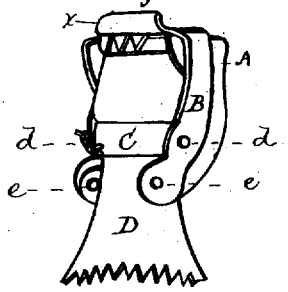
Figure 2:
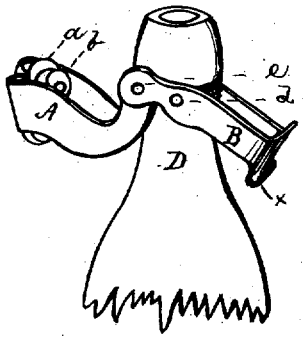

Figure 1 represents a perspective view of a bottle closed by my device. Fig. 2 represents the same opened.

C is the neck-band encircling the bottle-neck under the shoulder thereof.

B is the operating-lever yoke, with legs extending each side of the bottle-neck and connected together, forming a double lever, pivoted to the neck-band C at the points *d d*, and also pivoted to the legs of a stopper-carrying yoke, A, as at *e e*.

A is the stopper-carrying yoke, made also with two legs, each pivoted to the yoke B, as at *e e*, and connected together to straddle the bottle-mouth and the compound stopper *a b*.

*a* is the elastic stopper held by the yoke A. *b* is the central portion, made of cork, and designed to enter the bottle-mouth, so that *a* and *b*, together, form a compound stopper.

In constructing the device I have shown in the drawings I provide a yoke, A, of suitable size to fit over the neck of the bottle, and provide the same, on the inside, with a stopper. I next provide a second yoke, B, of such size as to fit snugly over the yoke A, pivot the ends of the two together, and pivot the arms of yoke B, a short distance from their ends, to opposite sides of a band, C, adapted to surround the neck of the bottle.

*a* is an outside rubber washer, to fit upon the mouth of the bottle, and *b* is an inside cork, to enter said mouth.

When the device is attached to the bottle, and the bottle is open, the parts stand in the position represented in Fig. 2, with the two yokes thrown back on opposite sides of the bottle.

In order to close the bottle it is only necessary to turn the yoke A up in a position to bring the stopper over the mouth, and then turn the yoke B upward over and around the other, as shown in Fig. 1. The action of yoke B is such that it first draws the stopper down with great force by means of the downward lever action of the portions between the pivots on band C and its pivotal connections with yoke A, so that when the pivots of the latter pass the vertical center line the device is locked, so that there will be no tendency of the parts to unlock when the stopper is subjected to a pressure from within the bottle.

Referring to the drawings, Fig. 1, it will be seen that as the pivots in the lower ends of yoke A swing horizontally beyond a vertical plane passing through the pivots in band C the yoke A, carrying the stopper, tends to rise under the influence of the upward pressure of the elastic material between the stopper and the bottle-mouth, which aids in turning the arms of the yoke B around their pivots on the band C until the connecting central portion of B strikes the top of the stopper-yoke on the bottle, when its motion is arrested, and it is held in place by the upward force of the elastic stopper.

In order to open the bottle the elastic stopper must be again compressed, by means of the reverse motion of the yoke B, until the pivots in the lower ends of A pass a vertical plane, passing through pivots in band C, when the stopper will be readily raised by the continued motion of the parts.

By arranging the operating-yoke to close over the mouth of the bottle and over the cork-carrying stirrup, as shown, I give the device additional strength and security, permit the use of a long and powerful operating-yoke, without rendering the device clumsy or objectionable in appearance, render the manipulation easy and convenient, and render the device free from danger of unlocking or being unlocked by accident. In order to facilitate the operation of the yoke B, I provide it with a curled lip or thumb-piece, *x*, as shown.

Having now described how I constructed my improvements, what I claim, and desire to secure by Letters Patent, is—

The combination, substantially as hereinbefore set forth, of a yoke provided with an elastic stopper, a band surrounding the bottle under the neck, and a U-shaped yoke pivoted on each side of the bottle to the stopper-yoke and to the neck-band, all constructed to operate in closing, holding closed, and unclosing a bottle, substantially as and for the purposes shown and described.

JOSEPH MORSCHHAUSER.

Witnesses:

C. MORSCHAUSER,

WM. GEO. TICE.